Aug. 24, 1965

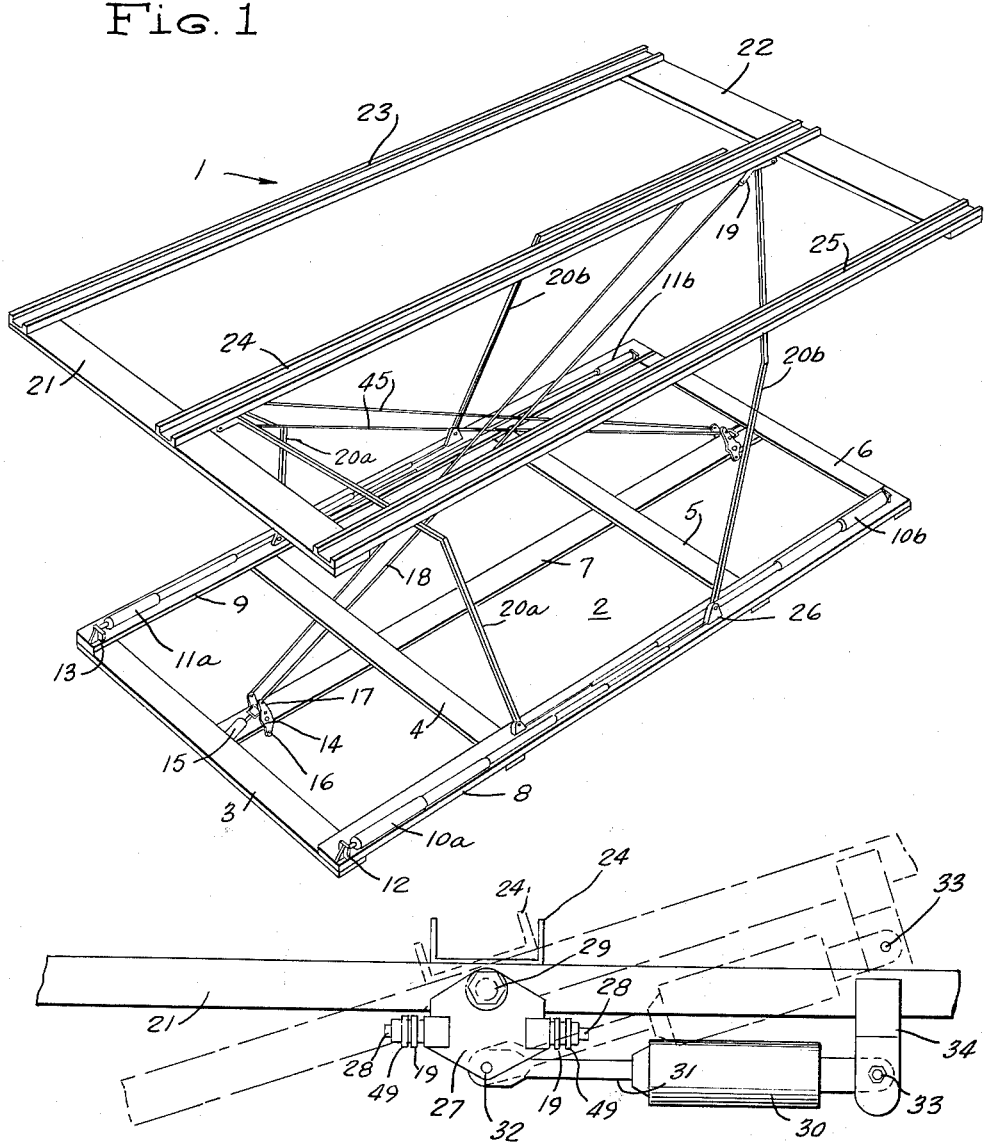

E. C. SEWARD 3,202,243

ELEVATOR FOR SHIPS

Filed Aug. 6, 1963

INVENTOR.
EDGAR C. SEWARD
BY *Joseph A. Hill*
ATTORNEY

Aug. 24, 1965  E. C. SEWARD  3,202,243
ELEVATOR FOR SHIPS
Filed Aug. 6, 1963  3 Sheets-Sheet 3
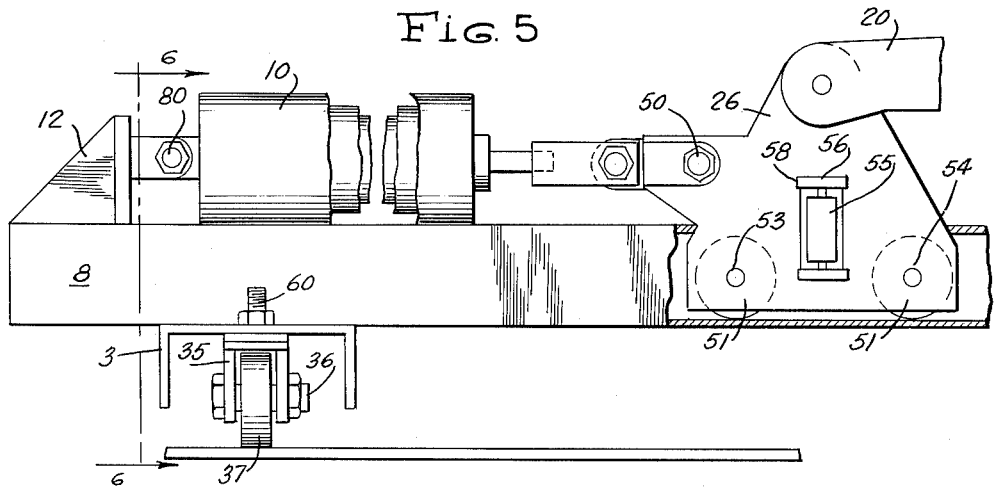
Fig. 5
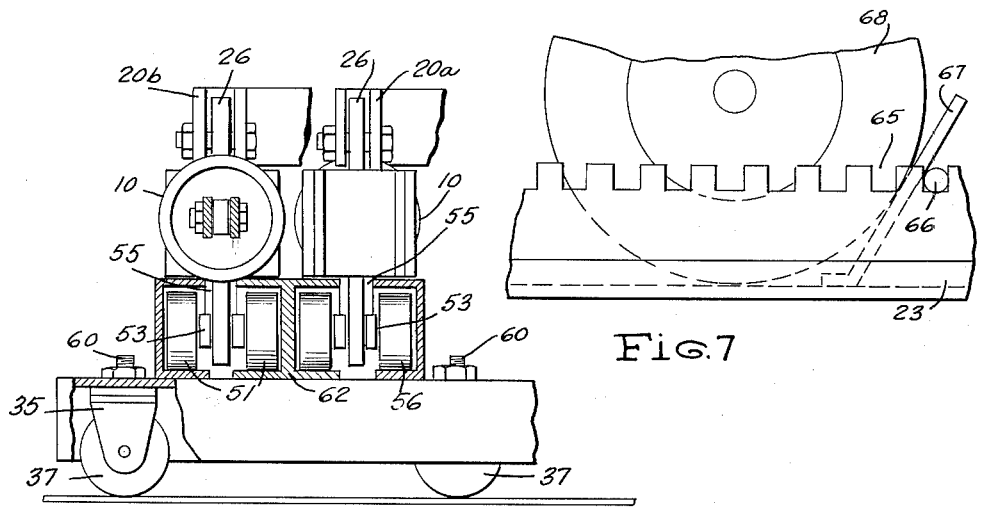
Fig. 6
Fig. 7
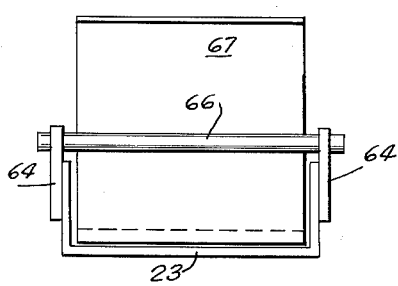
Fig. 8
INVENTOR.
EDGAR C. SEWARD
BY Joseph A. Hill
ATTORNEY United States Patent Office 3,202,243
Patented Aug. 24, 1965

3,202,243
ELEVATOR FOR SHIPS
Edgar C. Seward, 2008 S. Randolph St.,
Arlington 4, Va.
Filed Aug. 6, 1963, Ser. No. 300,398
11 Claims. (Cl. 187—9)
(Granted under Title 35, U.S. Code (1952), sec. 266)

The invention described herein may be manufactured and used by or for the Government for governmental purposes without the payment to me of any royalty thereon.

The invention relates to an elevator for raising and lowering cargo through openings in the decks of a ship and more particularly for raising and lowering cargo, the dimensions of which exceed the dimensions of the openings in the deck of a ship. While the invention can be used generally for all manner of cargo, a particular application is in the handling of aircraft which must be raised and lowered for example from the flight deck to the hangar deck of an aircraft carrier. It is comprised mainly of two platforms (an upper and lower platform) with interconnecting linkage capable of raising and lowering the top platform in relation to the lower platform. The uper platform is also tiltable in two longitudinal directions and two athwartship directions. This airplane elevator has a very high degree of maneuverability in that it is portable, i.e., on casters, elevatable, and tiltable in four directions.

When aircraft are carried on board ship there is quite a storage problem created. Usually in ships such as aircraft carriers the top deck is used for landing and the aircraft are stored either to the side of the landing area or they are stored within the hold of the ship. If the aircraft which can be either winged or helicopter type are to be stored below deck the present elevators for taking these craft below deck are limited in the size of the craft that they can handle. Because of the structure of the ship and the internal bracing required within the ship, there is a limit to the size of the opening in the deck for lowering aircraft. Heretofore, elevators have been used that merely lower vertically a section of the deck into the hold of the ship. This poses a problem if the aircraft has a 40 feet wingspan, for instance, and the opening in the deck is only 35 feet across. Some aircraft have been built with foldable wings for this purpose but not all airplanes are of this construction. Also, helicopter blades at present have not been made foldable. Accordingly, it is the principal object of this invention to solve this problem by the use of a highly maneuverable elevator that can tilt the aircraft while it is being lowered through the opening in the deck.

The invention will be described with reference to the following drawings wherein:

FIG. 1 is a perspective view of the aircraft elevator for ships;

FIG. 2 is an enlarged end view of the top platform of the elevator showing the mechanism for tilting the top platform athwartship;

FIG. 5 is a side view of the raising and lowering actuating assembly showing the relationship of the truck assembly and its hydraulic cylinder;

FIG. 6 is an end view of the raising and lowering actuating assembly;

FIG. 7 is a side view of a rail of the top platform showing the aircraft wheel stop; and FIG. 8 is an end view of the wheel stop.

Figure 3:
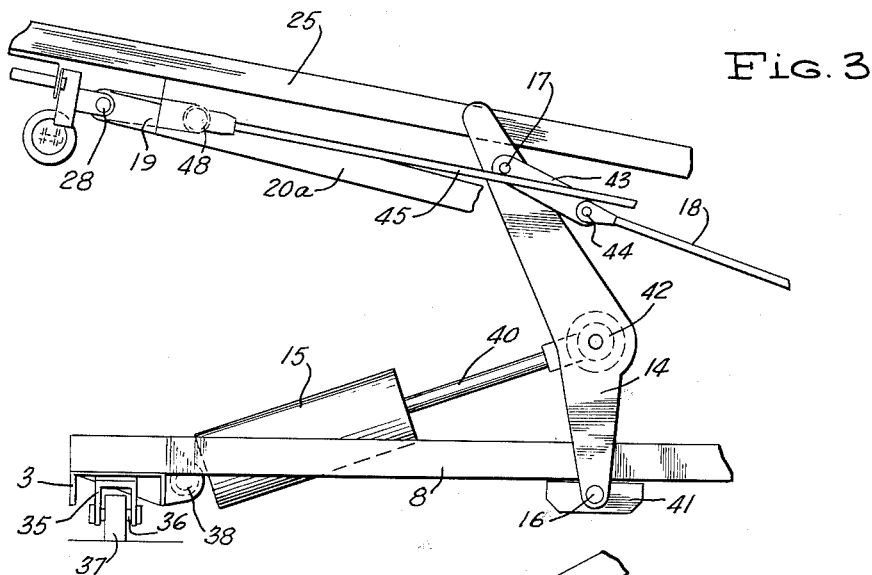
FIG. 3 is a side view of the lower platform showing the safety hold assembly.

Referring now to FIG. 1, the general operation of the aircraft elevator will be explained. Basically, the elevator is comprised of an upper platform 1 and a lower platform 2 with connecting linkage for raising, lowering, and tilting the top platform. The upper platform is a rectangular framework for supporting the aircraft. Longitudinal rails 23, 24, and 25 are so spaced on cross members 21 and 22 so that they match the wheel position of the aircraft to be used on the elevator. The rails or tracks are only given as an example and it is understood that there may be more or less rails or they may be spaced differently. In fact the top platform can be a solid floor that can handle any wheel spacing.

Directly below the upper platform is lower platform 2 comprised of two side members 8 and 9, a middle member 7 and cross braces 3, 4, 5, and 6. This braced platform is the base of the elevator and is caster mounted for movement sideways. Mounted on each side member 8 and 9 are hydraulic cylinders which operate to raise and lower the top platform in relation to the bottom platform. Arms 20a and 20b are fastened in a pivotal fashion to the top platform and are slidable along the bottom platform thereby forming a connecting link between the two platforms which can raise and lower the top platform. As the two pairs of arms 20a and 20b act independently of one another they can be used to raise or lower either end of the top platform. Each arm is bent to allow its top end to be connected to a pivot pin directly below the middle rail 24 of the top platform, and still have its lower end riding on outside rail 8 or 9 of the lower platform. To lower the top platform and at the same time maintain it in a level attitude the two pairs of arms 20a and 20b are moved in unison, by simultaneous movement of the hydraulic controls operating the hydraulic cylinders that cause angular movement of arms 20a and 20b. If it is desired to tip one end of the top platform 1, then either the front arms 20a or rear arms 20b are moved while the other pair remains stationary. Separate controls are provided for the front and rear hydraulic cylinders controlling the two pairs of arms 20a and 20b.

The hydraulic cylinders 10a and 11a shown in the near end of FIG. 1 have identical counterparts at the rear end of the lower platform 2. Cylinder 10a is mounted to side member 8 through a butting block 12 at one end and a roller mounted carriage 26 at the other end. Similarly cylinder 11a is connected to butting block 13 through pivotal connection and to a roller mounted carriage at the other end. Cylinders 10a and 11a control the angular movement of arms 20b. As these cylinders are contracted the roller carriage assemblies move along a track in side members 8 and 9 toward the rear end of lower platform 2 in FIG. 1. When both cylinders 10a and 11a are contracted the arms 20b are moved to a more horizontal position thereby lowering the end of top platform 1 having cross member 22. Both arms 20a and 20b are pivotally fastened to the ends of top platform 1 and have their bottom ends slidable in a horizontal direction along the bottom platform 2. When the top platform is raised to its limit, the arms 20a and 20b are nearly vertical and when the top platform is lowered to its limit the same arms are in a horizontal position.

As an added protection in the aircraft elevator a safety hold device is incorporated into the elevator. This safety hold device is comprised of a crisscross cable arrangement connecting each end of the top platform to the opposite end of the lower platform. These cable connections must be lengthened through mechanical means such as hydraulic cylinders before the platform can be raised. One end of such safety hold device is shown in FIG. 1.

Here, two cables 18 are attached at one end to the same pins that hold arms 20b to the top platform and these cables are attached to a hydraulic cylinder 15 at the opposite end. The piston end of hydraulic cylinder 15 is connected to the cables through a lever arrangement comprising two arms 14 which are pivotally mounted at one end through pin 16 to the longitudinal member 7 of lower platform 2. The top end of arm 14 is fastened to cables 18 through pin 17. By movement of the piston in and out of cylinder 15, the arm 14 can be pivoted about point 16 because the piston is connected to the center arm 14. Pivoting of this arm 14 in turn lengthens or shortens the distance between diagonally opposed ends of the top and bottom platforms. During the raising or lowering of the upper platform, the hydraulic cylinders on each end of the lower platform are moved so that the cables 18 and 45 are kept taut. These cables form a safety hold device that keeps the top platform from shifting from the front to rear or vice versa.

The design of the raising and lowering arms that permit longitudinal tilting requires that the cables 18 and 45 be employed to hold the aircraft elevator rigid. Were it not for these taut cables, the top platform would fold because of its four point suspension. The elevator forms a parallelogram structure of the top platform, bottom platform, arms 20a, and arms 20b. To hold this parallelogram rigid and to dip either the front or rear end the diagonal cables are very important. The cables 18 and 45 are likened unto the diagonal bracing of a parallelogram structure in which crisscross bracing can be lengthened or shortened to allow the parallelogram to shift from front to rear or vice versa, or to shorten the base of the parallelogram allowing the top of the parallelogram to settle onto the base. In actual practice, the operation of the aircraft elevator will operate as follows in lowering an aircraft. The top platform will be raised to the upper limit or to the level of the ship deck. After the aircraft is positioned in the rails and properly secured the top platform will be lowered. If all that is needed is a front to rear tilt, cables 45 will be slacked off and hydraulic cylinders 10b and 11b shortened or withdrawn thereby causing the cross member 21 of the top platform 1 to dip. After this end of the top platform has been dipped the platform as a whole can be lowered by slacking off both the cables 18 and the cables 45 and withdrawing the pistons into hydraulic cylinders 10a, 11a, 10b, and 11b. When all this is accomplished simultaneously, the top platform 1 having one end dipped will settle down on the lower platform and the aircraft will be within the hold of the ship. Next by using the casters mounted on the bottom of the lower platform 2 the whole aircraft and elevator can be maneuvered about within the hold of the ship. Now that the elevator is in its collapsed condition, the aircraft can be easily wheeled off the elevator and parked in a convenient place. To raise the elevator to deck level the reverse procedure is used and the cables 18 and 45 are tightened to hold the elevator rigid and to dip one end to get through the deck opening. Up to this point only the front to rear or longitudinal tilt has been discussed, but the aircraft elevator is also capable of athwartship tilting as will be pointed out in subsequent paragraphs.

FIG. 2 is an end view of the top platform 1 showing the structure of the athwartship tilting mechanism. The view is taken along the end view of member 24. Most of the athwartship tilting mechanism is hidden from view in FIG. 1 by cross member 21, but this mechanism is clearly shown in FIG. 2. Plate 27 is held in a fixed position between arms 20a by the two pins 28. The entire top platform pivots about plate 27 through pivot point 29. Pins 28 are firmly attached to plate 27 and hold it in its position. These pins are always in a horizontal attitude because they are supported, as is the whole top platform, by arms 20a and 20b. The top ends of both arms 20a are provided with a hole to fit over pins 28 and still have enough play in the connection to pins 28 to allow the top platform to be pivoted about pins 28 when the top platform 1 is tilted from front to rear, lowered, or raised. Cables 45 are also attached to pins 28 through a similarly pivoted connection which allows the same movement of the top platform.

Tilting of the top platform in an athwartship direction is accomplished by energizing hydraulic cylinder 30 and extending or contracting piston 31. Piston 31 is pivotally attached to the lower end of plate 27 by pin 32. Bracket 34 mounted on rail 21 pivotally supports the opposite end of the hydraulic cylinder 30 by means of pin 33. When the top platform 1 is to be tilted to the left, i.e., the left side is lowered and the right side raised, the distance between pins 32 and 33 is lengthened by expanding hydraulic cylinder 30 and piston 31. The reverse procedure is adopted to lower the right side of the top platform. Here, the distance between pins 32 and 33 is shortened by contracting the piston 31 within cylinder 30. From FIG. 2 it can be seen that the top platform has two axes of pivot; an athwartship pivot about pin 29 and a front to rear pivot about pins 28. Only one end of the top platform is shown, as concerns the connection of arms 20a, cables 45 and athwartship tilting means, but the opposite or far end of the top platform has an identical tilting and connecting means.

An enlarged view of the lower platform and the hydraulic means controlling the safety hold cables 45 and 18 is shown in FIG. 3. As can be seen this view is taken along the end view of cross member 3, with the top platform 1 lowered nearly to its collapsed condition and with one end higher than the other. The top platform is positioned at an angle to the floor within the hold of the ship and the bottom platform is shown horizontal and parallel to the floor as it always is. Side member 8 is bonded to end member 3 through a cross lap joint with member 3 being open to receive a caster 37. This caster is mounted by means of axle 36 within a U-shaped bracket 35 secured to the underside of member 3. With a caster such as 37 mounted on the four cross member 3, 4, 5, and 6 the whole aircraft elevator can easily be moved sideways.

The actuating means for the safety hold cables is comprised of a hydraulic cylinder 15 pivotally supported at one end by pin 38 which is in turn carried within a bracket fastened to cross member 3. Piston 40 of hydraulic cylinder 15 moves lever arm 14 to pivot about pin 16, said pin being carried within bracket 41. Near the center of lever arm 14 is a pivotal connection 42 for the movable piston 40 and at the opposite end of lever arm 14 from pin 16 is another pin 17 which connects linkage member 43 to the lever arm 14. Linkage member 43 is attached through pin 44 to cable 18. Through this arrangement cable 18 can be moved a greater distance than the hydraulic cylinder piston 40. Lever arm 14 is in fact a 3rd class lever connecting pivot pin 16, hydraulic piston 40 and cable 18, said cable representing the load. In order to show more detail of the safety hold mechanism only part of the entire side view of the aircraft elevator is shown. Cable 18 is attached to the opposite end of the elevator in the identical way cable 45 is attached to the top platform in FIG. 3. Cable 45 is pivotally pinned to link 19 at 48 and the link 19 is pivotally mounted on pin 28. By operating cylinder 15 and its counterpart cylinder at the opposite end of the lower platform, the top platform 1 can be held rigid as it is raised or lowered. When the platform 1 is dipped at one end, the cable connecting that end with the hydraulic cylinder at the opposite end is loosened allowing the end to dip. When the platform is lowered while in a level position, both the safety hold cylinders are extended to loosen their corresponding cables at the same time. Both the cables are loosened and the supporting arms 20a and 20b are moved into a more horizontal position to lower the top platform while level.

A top view of the safety hold mechanism is shown in

Figure 4:
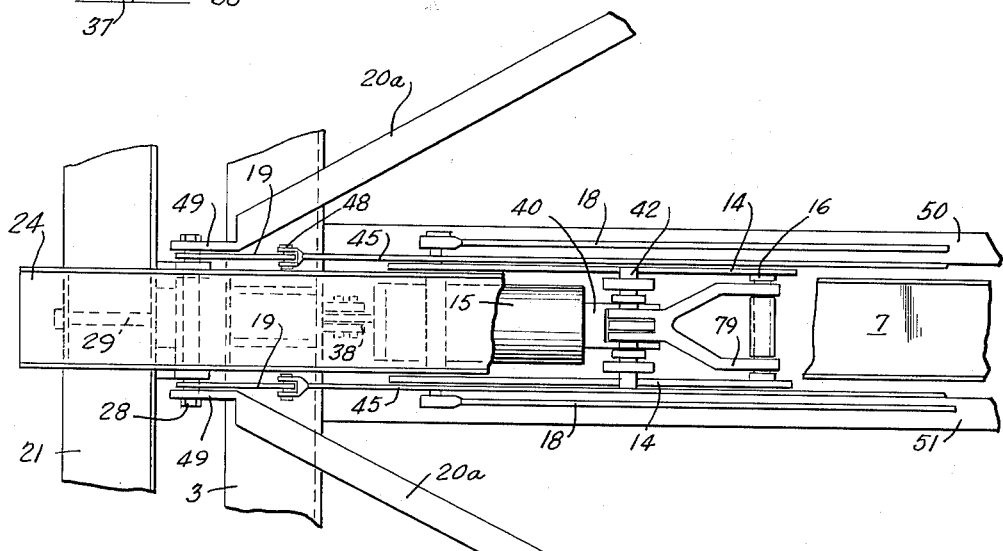
FIG. 4 is a top view of the middle rail of the top and bottom platform showing the connections for raising, lowering and tilting the aircraft elevator.

FIG. 4. In this figure, the top rail 24 has been broken away to show the hydraulic cylinder 15 and its mechanical connection to cables 18 and the lower rail 7. Perhaps a better understanding of the two axes of pivot of the upper platform can be acquired if FIG. 4 is compared with FIG. 2. FIG. 2 shows an end view of pivot pin 29 while FIG. 4 shows a top view. Pin 29 shown in dotted line in FIG. 4 is the main support for the top platform as concerns athwartship tilting, and pin 28 also shown in dotted line is the main support for the platform 1 as concerns front to rear tilt, raising and lowering. It is understood that throughout this specification that the term front to rear tilt means a tilt that is longitudinal as contrasted to an athwartship tilt and is meant to include a rear to front tilt as well as a front to rear tilt. Pin 28 supports the whole top platform and is itself pivotally supported by a flat portion 49 of arms 20a. Also attached to pin 28 on the inside of the flat portions of arms 20a are linkage members 19. Cables 45 are connected to this linkage 19 through pin 48 and have their opposite ends coupled to a hydraulic cylinder and lever arm, which is not shown in this drawing.

As can be seen from the drawing in FIG. 4, the piston 40 is withdrawn into hydraulic cylinder 15, and the arms 14 are in a nearly horizontal position. The cylinder 15 is attached to cross arm 3 of the lower platform 2 with pin 38 on one end and to the center of arm 14 with pin 42 at the end of piston 40. Lever arms 14 are on either side of middle member 7 of the lower platform and are pivotally mounted through pin 16. An additional Y-shaped bracing 79 connects pin 16 with pin 42. This bracing 79 moves along with the lower half of lever arm 14 and prevents any sideways twist to occur between lever arms 14. The ends of bracing 79 are pivotally mounted to the pins 16 and 42. As the lever arm 14 is raised, the cables 18 are loosened, thereby allowing the top platform to be raised. Additional side rails 50 and 51 which are not shown in the other figures give support to rail 7 and run the length of the bottom platform connecting cross rails 3, 4, 5, and 6.

FIG. 5 is a side view of rail 8 showing the telescoping hydraulic cylinder and truck mechanism that powers the arms 20a and 20b. In this figure rail 3 is taken from the same view as in FIG. 3 but here the hydraulic cylinder 15 and safety hold mechanism are not shown and the emphasis is on the outside rail 8 and not the middle rail 7. Caster 37 mounted on axle 36 within U-shaped bracket 35, said bracket fastened to rail 3 by bolt 60, is the same caster arrangement as shown in FIG. 3. Hydraulic cylinder 10 is a mutli-telescoping unit cylinder capable of considerable extension and contraction. This cylinder is connected to anchor 12 by pin 80. Pin 80 only serves as a means to hold the cylinder 10 steady. There is no pivotal action about pin 80 because the cylinder 10 is always horizontal. As the multi-telescoping sections of cylinder extend or contract they force a truck mechanism to travel back and forth along rail 8. The truck mechanism comprises a triangular plate 26 connected at its top apex pivotally to an arm 20a, and having each of its other two corners supporting a pair of rollers 51. These rollers rotate about axles 53 and 54 and travel along track means within side arm 8. As the truck mechanism is forced to the right by the extension of cylinder 10 which exerts a force on triangular plate 26 at pin 50 the arm 20a is forced to rotate into a more vertical position and raise the opposite end of the aircraft elevator. To keep any possible friction within the tracks or side draft to a minimum a roller 55 is provided within an opening near the center of triangular plate 26. This roller rides on bearings 58 and 59. Within these bearings are the axles 56 and 57 of the roller which turn freely within bearings 58 and 59 and hold triangular plate 26 erect.

An end view of hydraulic cylinders 10 is shown in FIG. 6. It will be noted that there are two hydraulic cylinders 10 in this end view. One is labeled "near end" and the other is labeled "far end." This is the designation given to these cylinders depending on which end of the elevator they are anchored by pin 80 and stop 12. Hydraulic cylinder labeled "near end" has its anchor nearest the viewer but this anchor has been cut away to give a clearer picture of the truck assembly. The near end cylinder operates supporting arms 20a and the far end cylinder operates supporting arms 20b. The physical relationship between these two cylinders can perhaps be better indicated with reference to rail 8 of FIG. 1. FIG. 6 is merely an end view of rail 8.

The track system or actually rail 8 consists of a center I-beam 62 and a channel member 63 on each side of this I-beam forming two tracks. Within each of these tracks are four wheels 51, the front two showing in FIG. 6. The rear two wheels are hidden from view but their position is shown in the truck assembly of FIG. 5. In each track are carried wheels 51 supporting axle 53 and triangular plate 26. In between the inside and outside wheels of each track is a vertical roller 55 to prevent side draft and to hold the triangular plates in alignment and to prevent the rollers from rubbing against the vertical edges of the I-beam and channel irons. This roller is positioned within an opening near the center of triangular plate 26.

At the top of the triangular plates are attached the support arms 20a and 20b, arm 20a being attached to the right or near end cylinder and arm 20b being attached to the left or far end cylinder. When these two cylinders 10a and 10b are operated simultaneously the arms 20a and 20b move to raise or lower the top platform 1 while it retains a level position. If the two cylinders 10a and 10b are operated independent of one another the top platform will be dipped at one end. This will give the aircraft elevator a large degree of maneuverability.

To prevent the aircraft wheels from rolling within the channels of the top platform when the top platform is tipped, a wheel stop is incorporated into the rails as shown in FIGS. 7 and 8. FIG. 7 is a side view of a representative rail such as 23 with the wheel stops. An extension 64 with a series of notches 65 is welded onto the U-shaped rail 23, on each side of the rail. Across two corresponding notches in extensions 65 is placed a rod member 66. One of these rod members is placed both in front of and behind the aircraft wheel. Between the rod member and the wheel is placed a flat stop member 67 both in front and behind the wheel. With the wheel positioned between two of these stop members 67 the aircraft is held stable when the top platform is dipped at one end to permit its movement through a deck opening in a ship.

FIG. 8 is an end view of the wheel stop device in FIG. 7. It shows rod member 66 positioned within two corresponding notches in side extensions 64. Stop member 67 is shown as a rectangular plate of sufficient strength to prevent movement of the aircraft wheel when the top platform has one end dipped. The side extensions also hold the wheels in place when the top platform 1 is tilted athwartship.

I claim:
1. An elevator for moving cargo between decks of a ship wherein the cargo dimensions exceed the dimensions of the openings in the decks of the ship, the elevator comprising:
 (a) an upper platform;
 (b) a lower platform;
 (c) supporting arms each pivotally connected at its top end to said upper platform and having its lower end slidable along the plane of said lower platform;
 (d) actuating means to cause said lower end of the supporting arms to slide back and forth along the plane of said lower platform;
 (e) a safety hold mechanism of crisscross cable bracings between said upper and lower platforms, said cable bracings capable of being shortened or lengthened; and
 (f) an athwartship tilting connection between said upper platform and said supporting arms for tilting of said upper platform.

2. An elevator for ships as claimed in claim 1 wherein the upper platform is comprised of a series of parallel rails spaced so as to fit the spacing of wheeled vehicles and cross members perpendicular to said parallel rails and fastened to them.

3. An elevator for ships as claimed in claim 1 wherein the lower platform comprises two outside longitudinal rails, a center longitudinal rail, and cross rails perpendicular to and connected to said longitudinal rails.

4. An elevator for ships as claimed in claim 1 wherein the actuating means to cause one end of said supporting arms to slide back and forth along said rails comprises a truck riding along said rail, said truck being pivotally connected to the lower end of said supporting arm and a hydraulic cylinder mounted at one end to the rail of said lower platform and at the other end to said truck.

5. In an elevator for ships having an upper and lower platform and supporting arms connecting said upper and lower platforms, the improvement of a four way pivotal connection between said upper platform and the upper end of said supporting arms comprising:
 (a) a vertical plate member held in position by a pair of support arms with fastening means on each end of said plate;
 (b) a pivot pin at right angles to the axis line between said fastening means, said pivot pin connecting the top platform to said vertical plate member and allowing athwartship pivoting about said pivot pin of the top platform; and
 (c) motor means connected between said vertical plate and said top platform to cause athwarthship tilting of said upper platform about said pivot pin.

6. An elevator for ships as claimed in claim 1 wherein the safety hold mechanism comprises:
 (a) a pair of lever arms pivotally mounted at their lower ends to a center rail of said lower platform at each end of said platform;
 (b) cable means connecting the top ends of said lever arms and the opposite end of said upper platform, said cables forming a diagonal bracing between said upper and lower platforms; and
 (c) hydraulic cylinder means connected between said lower platform and the center of said lever arms capable of pivoting said lever arm about said pivotal mounting on said center rail of said lower platform.

7. An elevator as claimed in claim 4 wherein the truck comprises:
 (a) a triangular vertical plate member;
 (b) a pivotal connection at the apex of said triangular plate for the lower end of said supporting arm;
 (c) horizontal roller means rotatably mounted at the bottom two corners of said triangular plate positioned to roll along the bottom of a track within said side rail of said lower platform; and
 (d) vertical roller means positioned and mounted within an opening near the center of said triangular plate, said vertical roller means running along the sides of said track within said side rail.

8. An elevator as claimed in claim 1 wherein said lower platform is mounted on casters to provide lateral movement of the entire elevator.

9. An elevator for ships as claimed in claim 2 wherein said U-shaped rails have:
 (a) notched side extensions on each side;
 (b) a cross rod positioned between the notches of said extensions on each side of said rails; and
 (c) a stop plate wedged between said cross rod and cargo support, said cross rod and stop plate combination being placed both in front of and behind each cargo support.

10. A lifting mechanism comprising:
 (a) an upper platform;
 (b) a lower platform;
 (c) support arms connected at their upper end by universal jointing to said upper platform and having their lower ends slidably mounted on said lower platform;
 (d) actuating means to cause said lower ends to slide along the plane of said lower platform;
 (e) actuating means operating on said upper platform to cause tilting of said upper platform about its axis; and
 (f) bracing of adjustable length coacting between said upper and lower platforms.

11. The apparatus of claim 10 having four support arms, said arms being arranged in two pairs each pair being fastened at its upper end by universal jointing to said upper platform at points along the axis thereof and on opposite sides of the midpoint of said axis.

References Cited by the Examiner
UNITED STATES PATENTS 2,523,734 9/50 Stephenson.
2,672,243 3/54 Marsh.
3,087,630 4/63 Karnow.

SAMUEL F. COLEMAN, *Primary Examiner.*